United States Patent [19]

Karmen et al.

[11] Patent Number: 4,600,690
[45] Date of Patent: Jul. 15, 1986

[54] IMMUNOASSAY

[75] Inventors: Arthur Karmen, Manhasset; Fred D. Lasky, Ardsley, both of N.Y.

[73] Assignee: Albert Einstein College of Medicine of Yeshiva University, A division of Yeshiva University, Bronx, N.Y.

[21] Appl. No.: 515,286

[22] Filed: Jul. 19, 1983

Related U.S. Application Data

[63] Continuation of Ser. No. 931,501, Aug. 7, 1978, abandoned.

[51] Int. Cl.$^4$ .................. G01N 33/53; G01N 33/557; G01N 33/534
[52] U.S. Cl. ........................................ 435/7; 436/517; 436/804
[58] Field of Search ...................... 435/7; 436/804, 517

[56] References Cited

U.S. PATENT DOCUMENTS 3,899,298  8/1975  Szczesniak ........................... 422/61
4,134,792  1/1979  Boguslaski et al. .................. 435/4
4,492,751  1/1985  Boguslaski et al. .................. 435/7

OTHER PUBLICATIONS

Radioimmunoassay of Biologically Active Compounds, Parker, Prentice-Hall Inc., New Jersey, 1976, pp. 130–133.

Primary Examiner—Robert J. Warden
Assistant Examiner—Patricia Kate White

[57] ABSTRACT

There is disclosed a method for immunoassay and/or competitive binding assay, wherein an excess amount of unlabeled antigen is added after the start of the reaction between the labeled ligand, the unlabeled ligand, and the binding agent or antibody, to saturate or flood the antibody binding sites. This provides increased sensitivity allowing for more reliable and precise measurements of ligands including antigens than heretofore. The present method extends the scope of applicability of competitive binding technique for assay of hormones, drugs and other compounds.

5 Claims, 14 Drawing Figures

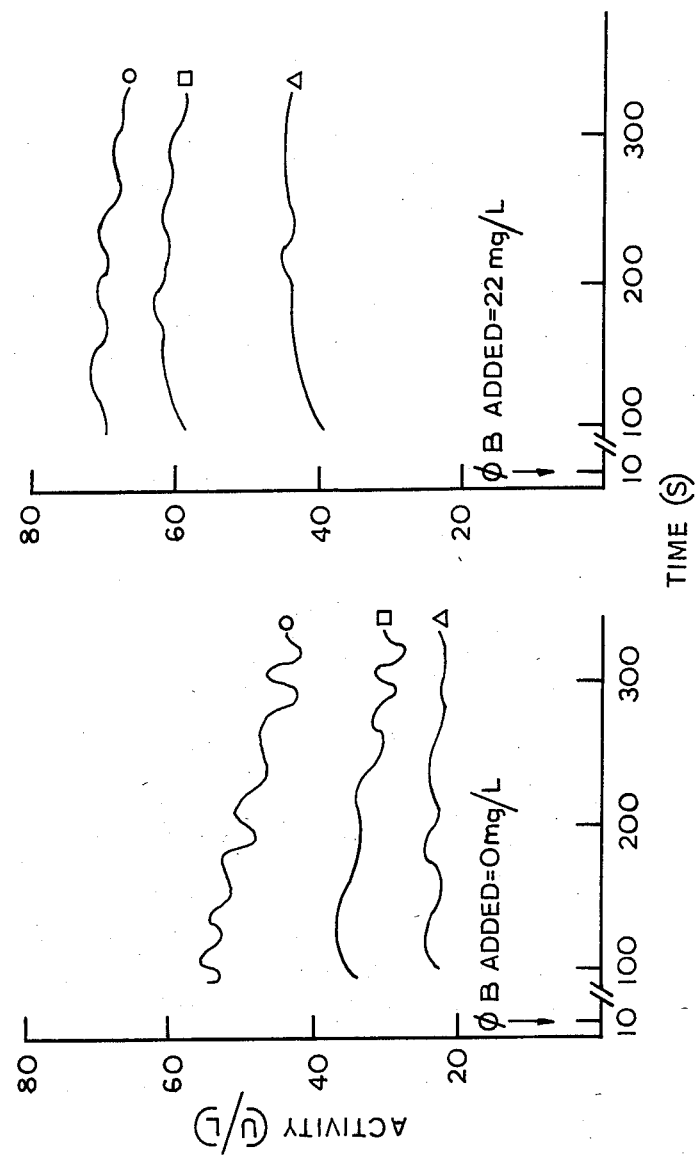

ACTIVITY AS A FUNCTION OF ADDITION OF EXCESS ANTIGEN
φ B stds  ○=80mg/L  □=10mg/L  △=0mg/L
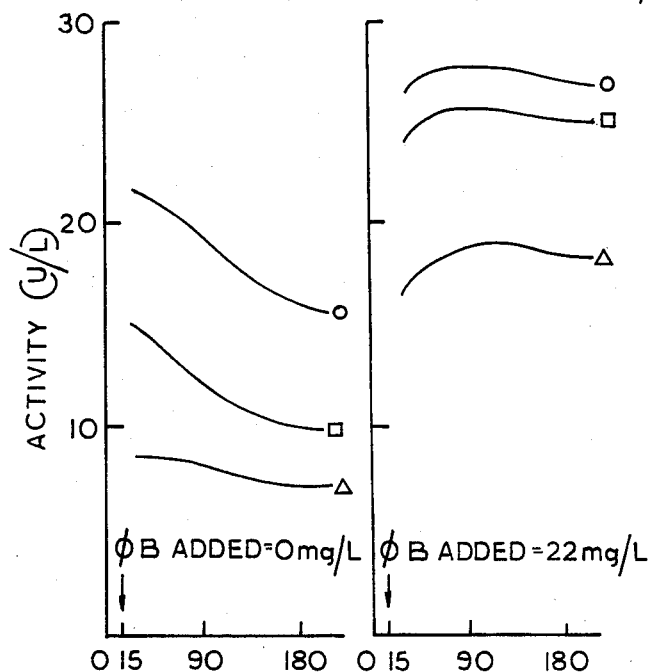
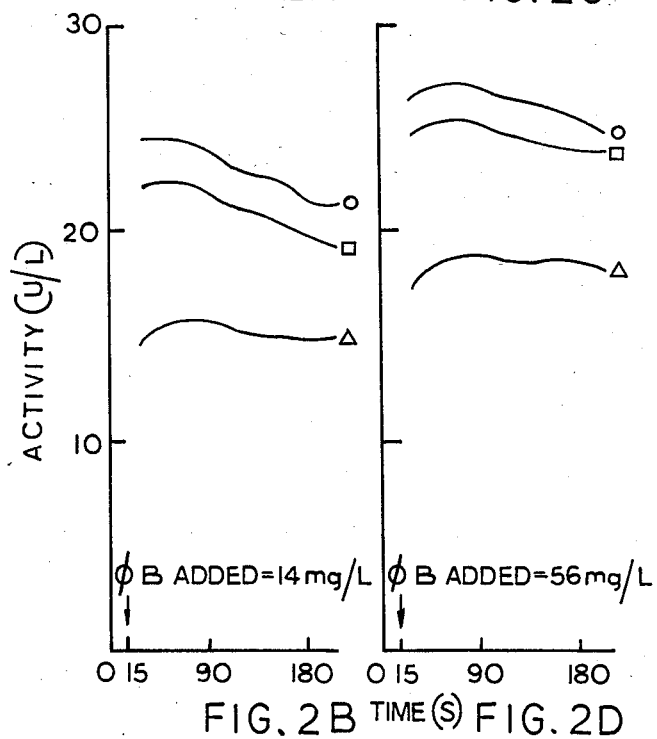

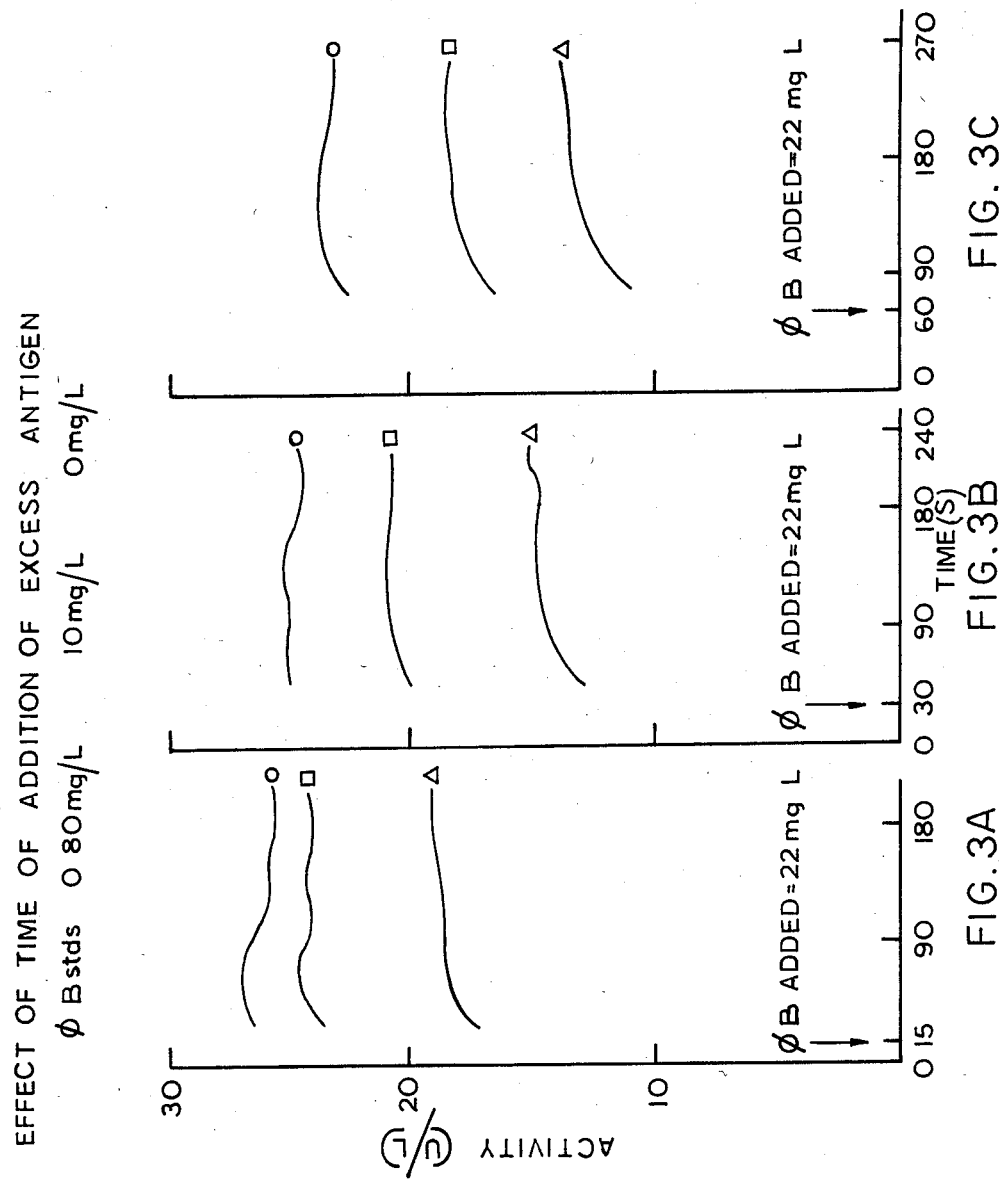

ACTIVITY AS A FUNCTION OF
ADDITION OF EXCESS ANTIGEN (THEOPHYLLINE)
ϕ B stds  O=80mg/L  □=10mg/L  △=0mg/L
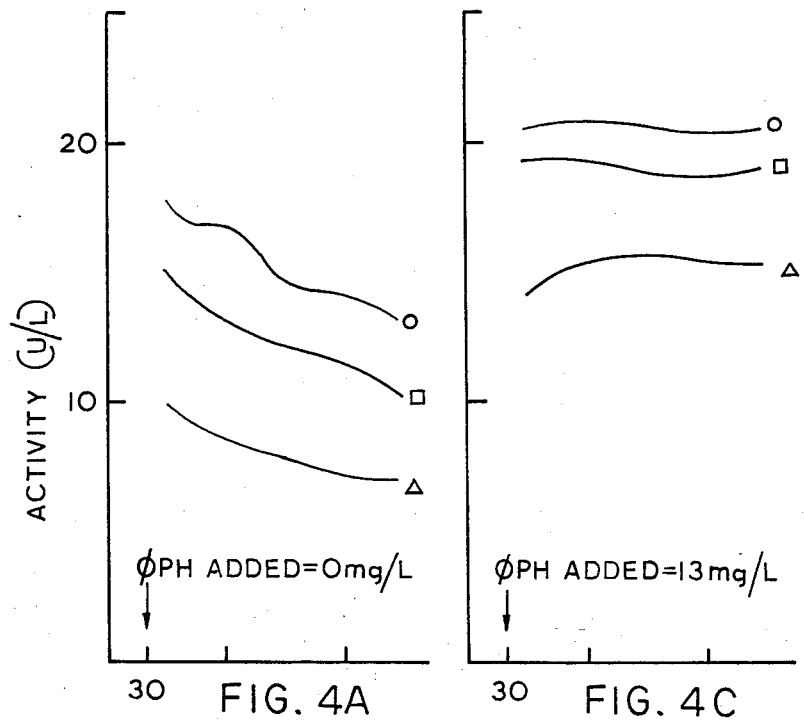
FIG. 4A  ϕPH ADDED=0mg/L
FIG. 4C  ϕPH ADDED=13mg/L
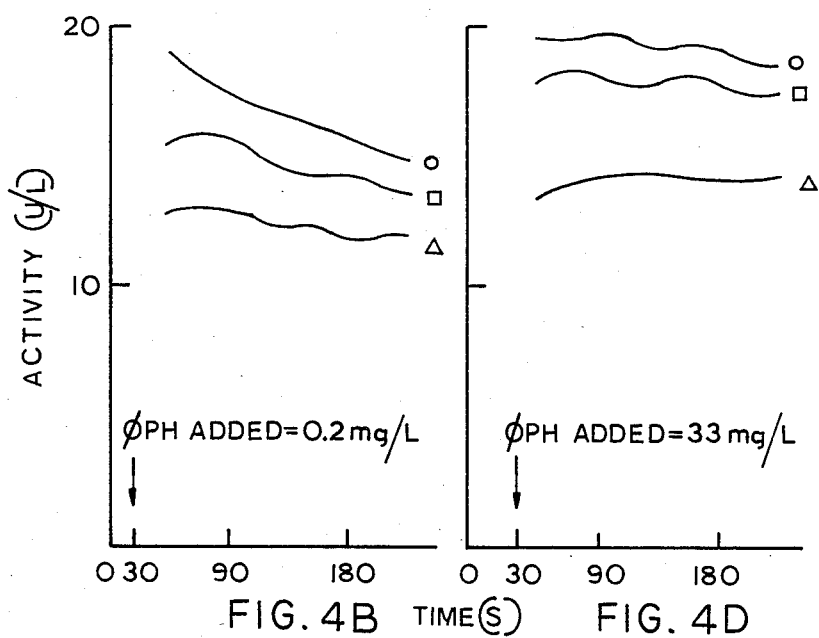
FIG. 4B  ϕPH ADDED=0.2mg/L
FIG. 4D  ϕPH ADDED=33mg/L 4,600,690

IMMUNOASSAY

This is a continuation of application Ser. No. 931,501, filed Aug. 7, 1978, now abandoned.

FIELD OF THE INVENTION

This invention relates to measurement of materials especially biologically active substances. Specifically this invention relates to a method for the measurement of drugs, narcotics or hormones. More specifically this invention relates to a method for the measurement of small quantities of drugs, narcotics or hormones in body fluids.

BACKGROUND OF THE INVENTION

There is a continually pressing need for rapid, accurate qualitative and quantitative determinations of biologically active substances at extremely low concentrations. The purpose of the determination can be extremely varied. Today, there is a wide need for determining the presence of drugs or narcotics in body fluids, such as saliva, blood or urine. In addition, in medical diagnosis, it is frequently important to know the presence of various substances which are synthesized naturally by the body or ingested. There is also a pressing need to make such determinations by an automated method to reduce the time and effort required.

DISCUSSION OF THE PRIOR ART

In Schuurs et al., U.S. Pat. No. 3,654,090, granted Apr. 4, 1972, there is disclosed a method for the determination of a component of an antigen-antibody reaction involving the addition of an enzyme-labelled component wherein the specific enzyme activity can be measured. In Rubenstein et al., U.S. Pat. No. 3,817,837, granted June 18, 1974, there is disclosed an enzyme amplification assay method employing enzyme-bound antigens, wherein the amount of antigen in a solution is determined.

In the Enzyme Multiplied Immunoassay Technique of Rubenstein et al., "Homogenous Enzyme Immunoassay, a new Immunochemical Technique," 47 Biochem. Biophys. Res. Commun. 846 (1972), there is disclosed such prior art method for determining drugs in serum. In this technique a serum containing the drug to be determined is mixed with an antibody to the drug. A solution of the same drug covalently coupled to an enzyme not found in the serum is then added, and the activity of the enzyme is measured. The enzyme-coupled drug binds to the antibody on binding sites not occupied by the drug. Thus the enzyme activity changes (e.g. diminishes) and the remaining enzyme activity is a function of the drug in the serum. The concentration of the drug is determined by comparing the enzyme activity with that resulting from standard solutions of the same drug.

In such enzyme multiplied immunoassay technique, the activity of the drug-labeled enzyme decreases continuously with time as more of it is bound to the antibody. The enzyme activities of mixtures containing different concentrations of drug become more similar with time, with a resulting decrease in sensitivity. In effect the enzyme activity immediately after mixing is the most sensitive indicator of drug concentration.

Thus, such prior art techniques necessitated a fast determination which limits precision and limits detection of small quantities of a drug.

Now there is provided by the present invention a method for determination of small quantities of compounds wherein more accurate determinations can be made, while avoiding some of the time and reagent constraints of prior art techniques.

It is therefore a principal object of this invention to provide a method for determination of substances in a fluid wherein small concentrations of such substance can be more accurately measured.

It is another object of this invention to provide a method as aforesaid wherein the time in which to take the measurement is sufficient to assure that an accurate measurement is being taken.

It is a further object of this invention to provide a method as aforesaid wherein the reagent usage is minimized.

It is still a further object of this invention to provide an improvement to the present enzyme multiplied immunoassay technique.

It is still a further object of this present invention to provide a method as aforesaid wherein drugs or narcotics in body fluids can be accurately determined.

It is another object of this invention to provide a method for enzyme immunoassay which automatically measures the concentration of the drug.

It is still a further object of this present invention to provide methods for improving competitive-binding and immunoassays of a variety of compounds in which any of several kinds of binding reagents are employed and any of several kinds of procedures and labels are used to label the labeled ligand.

The aforesaid as will become apparent from a reading of the following description, the adjoined claims and the accompanying drawings in which:

FIGS. 1A and 1B are graphs showing the dynamic loading of excess antigen on the enzyme activity;

FIGS. 2A–2D are graphs showing the enzyme activity as a function of several additions of excess antigen;

FIGS. 3A–3C are graphs showing the enzyme activity with the effect of the time of addition of excess antigen;

FIGS. 4A–4D are graphs similar to that of FIGS. 2A–2D but for another antigen.

DESCRIPTION OF THE PREFERRED EMBODIMENTS

Figure 5:
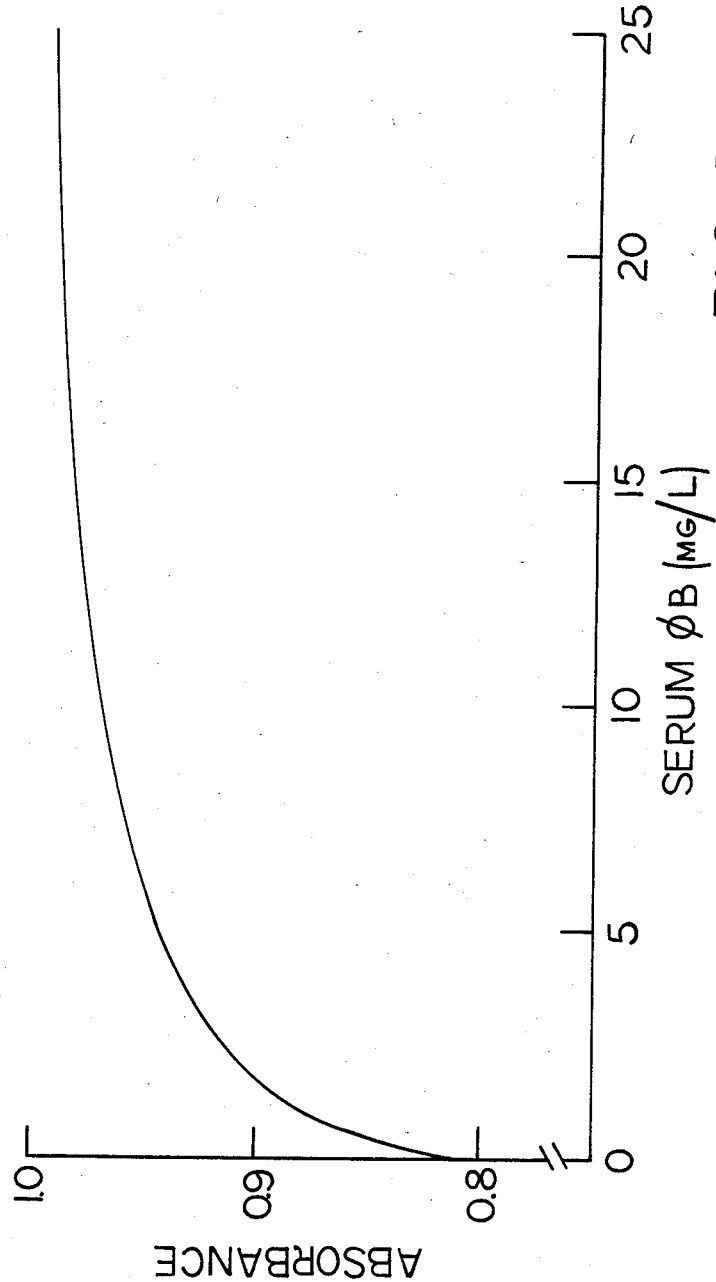
FIG. 5 is a graph of measured absorbance values vs. serum concentration in mg/l.

Broadly speaking the present invention comprises a method for detecting the concentration of a drug in a fluid by competitive binding or immunoassay, such as enzyme multiplied immunoassay, wherein an excess amount of unlabelled antigen is added after the start of the reaction to "flood" or saturate binding sites.

In one aspect this invention is a method for immunoassay comprising;

(a) adding a sample containing the antigen, such as a drug, an antibody to the drug and an enzyme-labelled drug, to react same;

(b) at a definite time thereafter, adding said drug to the reactions; and (c) measuring the enzyme activity.

In another aspect, this invention is a method for the determination of the concentration of an antigen comprising;

(a) adding a solution containing an unlabelled antigen, an antibody to the antigen, and an enzyme-labelled antigen to react same;

(b) at a definite time thereafter adding unlabelled antigen to the reaction of step a., and (c) measuring the enzyme activity in the solution.

An important aspect of the present invention is the recognition to add sufficient unlabelled antigen to "flood" or saturate the unreacted antibody sites, and the time of this addition should be after the initial reaction between antibody and labelled antigen has started. In the current procedure, the unlabelled antigen may be added from 1 to 50 seconds preferably from 15 to 30 seconds after the reaction commences.

The antigen-enzyme conjugate should preferably consist of the immunochemically reactive molecule and one or more enzyme molecules, linked together by one or more covalent bonds. This covalent linking can be achieved either by direct condensation of existing side chains, or by addition of external bridging molecules. Many bivalent or polyvalent agents, bringing about coupling of protein molecules, have been reported in the literature and may be used to obtain conjugates, such as carbodiimides, diisocyanates, p,p'-difluorom,m'dinitrodiphenylsulphone, glutaraldehyde, dimethyladipimate, bisdiazobenzidine, N-ethyl-5-phenylisoxazolium-3'-sulfonate and ethylenemaleic anhydride-copolymers with or without hexamethylene diamine. The conjugates must always retain at least part of both immunochemical and enzymatic activity.

The compound in step b may be the same or different than the analyte in step a so long as the compound competes for the same binding sites as the analyte. The terms antigen, analyte, compound and drug are used interchangeably in the specification and claims to refer to the material to be assayed. The term ligand is usually used in the phrase "labeled ligand" which refers to the material to be assayed coupled to a label. However, ligand also refers to any substance which competes with the material to be assayed for the same binding site on the binding reagent.

The method of the present invention is suitable for detecting small quantities of diverse materials including drugs or narcotics, such as barbiturates, diphenylhydantoin, primidone (Mysoline), carbamazepine (Tegretol), ethosuximide (Zarontin), theophylline, alkaloids such as opiates (morphine alkaloids) including by way of example, heroin, hydromorphone, oxymorphone, metopon, codeine, hydrocodone, dihydrocodeine, dihydrohydroxycodeinone, dextromethorphan, and their metabolites; methadone and methadone analogs (e.g., propoxyphene (Darvon) and acetylmethadol); indolealkoloids (e.g. ephedrine, epinephrine, L-dopa, benzidrine (amphetamine), paredrine, methamphetamine, methyl phenidate and norephedrine); barbiturates; glutethimide; cocaine; marijuana, tranquilizers such as mephrobamate (e.g. Miltown or Equanil) or the benz-diazocycloheptaines (e.g. Libriuum, valium, diazepam or Oxazepam); amino acids polypetides including those with endocrine proteins, steroids activity; vitamins, hormones, and so forth.

Any enzyme which is capable of specifically labelling specific antigen is useful pursuant to the present invention. commerical enzyme-labelled antigen are readily available and may be prepared by one skilled in the art. The drug or narcotic to be measured may be tested according to the present invention when it is in any suitable fluid. Suitable fluids include carrier fluids and preferrably body fluids such as blood, serum, urine, saliva, and the like. Further this invention is not limited to human body fluids as carriers but animal fluids are also within the contemplation of this invention.

EXAMPLES

The various reagents used in the following examples were those supplied in enzyme-multiplied immunoassay (EMIT) kits were reconstituted as recommended in the package insert. "EMIT" is a registered trademark of Syva Corp., Palo Alto, Calif. Vial A contains antibody to the drug of interest and the substrate to the enzyme label. Vial B contains enzyme-labeled drug, e.g., glucose 6-phosphate dehydrogenase covalently coupled to phenobarbital.

Apparatus used in the following examples was an ORNL miniature centrifugal fast analyzer (CFA), interfaced with a PDP/8e computer (Digital Equipment Corp., Maynard, Mass. 01754), was used as recommended by ORNL for enzyme assays. Unlike other CFA's, this device employs a one-piece rotor that contains sample and reagent compartments and cuvettes, which is removed for loading and placed on the centrifuge-spectrophotometer for mixing and reading. The rotors used had 17 cuvettes with 0.5-cm light paths that could accommodate 125 to 150 $\mu l$ total reaction volume.

The rotors were loaded with the loading station devised at ORNL, which includes two modified Micromedic Automatic Pipettes (Micromedic Systems, Inc., Horsham, Pa. 19044) for dispensing and diluting specimens and reagents.

Rotors were loaded for EMIT assays by the following procedure. Initially, 40 $\mu l$ of standard, control, or patient's serum was diluted with 200 $\mu l$ of diluted buffer, which was then mixed, and poured into the sample cup of the rotor loader. Ten (10) $\mu l$ of the solution was then dispensed into the outer well of the rotor, followed by 22 $\mu l$ of water. Simultaneously, 8 $\mu l$ of concentrated buffer was dispensed into the inner rotor well and diluted with 23 $\mu l$ of water. The rotor was then sent through the loader a second time to dispense 10 $\mu l$ of the contents of vial A and 22 $\mu l$ of water into the outer well and 10 $\mu l$ of the contents of vial B and 22 $\mu l$ of water into the inner well. During this procedure the drug contained in the serum presumably had an opportunity to react with antibody, although mixing was probably incomplete. The total reaction mixture was 129 $\mu l$. Cuvette No. 1 contained water as a reference.

Reagents to be introduced after the first set of reactants were mixed were added to the mini-CFA cuvettes by "dynamic loading," a technique which allows reagents to be added to all cuvettes while a reaction is in progress. This "dynamic loading" technique is described in Burtis, C. A., Johnson, W. F., Overton, J. B., et al., "Optimization and analytical applications of the technique of dynamic introduction of liquids into centrifugal analyzers," 20 *Clin. Chem.*, 932 (1974). A thin stream of solution was injected into the center of a spinning rotor through the 26 gauge needle attached to an SMI Micro-Pettor (Scientific Manufacturing Industries, Emeryville, Ca.). In this way, 250 $\mu l$ of additional solution was distributed among the 17 cuvettes.

To determine the uniformity of distribution of solution to each cuvette, a dye dilution was used. Rhodamine, sufficient to produce an absorbance of 0.3 at 550 nm, was added to the solution to be dynamically loaded. Rhodamine, in this concentration, produces negligible change in the absorbance at 340 nm, and had no apparent effect on the antigen-antibody reaction.

At the end of the immunoassay, the transmittance of each cuvette was measured at 550 nm. The results from those cuvettes with transmittance that varied less than 15% from the mean were used. The final reaction volumes were therefore 144 μl.

A Beckman 24/25 spectrophotometer, with recorder, interfaced with a DP 3000 microprocessor (Beckman Instruments, Inc., Fullerton, Ca.) was also used. In these experiments, 30 μl of vial A and 200 μl of buffer were added to 30 μl of standard (previously diluted by adding 30 μl serum standard with 200 μl buffer) and 200 μl of buffer. Reagent B (30 μl) followed by 200 μl of buffer was then added to start the reaction. Additional reagent was added with a SMI Micro-Re/Pettor (Scientific Manufacturing Industries, Emeryville, Ca.). The final solution (990 μl) was then drawn into the 1 cm light path flow cell.

The DP 3000 which waits 6 s (seconds) after the sample is aspirated into the cuvette was programmed to wait an additional 10 s to allow for temperature stabilization, and then to record the activity of the solution 7 times at 30-s intervals.

All experiments were run at 30° C. Reagents were incubated at that temperature in a water bath controlled to 30±1° C. The Mini-CFA controls the temperature to within ±1° C. using a thermistor mounted in a cell in the rotor to provide a signal which controls a heating lamp placed above the rotor. The Beckman flow-through cell is temperature controlled to within ±0.1° C. The DP 3000 microprocessor monitors the flow cell temperature independently and flags any deviation.

Absorbance changes ranged from 0.05 per min for the zero standard to 0.18 per min for the high standard.

The loaded rotor was placed on the analyzer and a plastic plate was positioned over the loading holes to prevent evaporation. It was then brought to 30° C. by slow rotation under the heat lamp. After the set-point temperature was reached, an additional minute was allowed to elapse for thermal equilibrium. The automatic logic circuit was then triggered. The rotor was accelerated to 400 rpm to transfer all solutions into their respective cuvettes, and then was stopped suddenly to mix all components. The rotor was then quickly brought up to 3000 rpm and the computer began taking data as prescribed in the selected program.

The additional drug was then introduced into the cuvettes by injecting a concentrated phenobarbital solution into the rotor center 10 s after 3000 rpm was attained. After 55 s, the speed was reduced to 600 rpm.

To determine the time required for complete mixing, water was loaded into the reference cuvette and dye (para-nitrophenol) into the remaining 16 cuvettes. Water was then dynamically loaded. The reference cuvette absorbance was thus unchanged. The absorbance at 405 nm, recorded at 3-s intervals, became constant after 45 s. Mixing was said to be complete at that time.

The results of the foregoing examples are plotted in FIG. 1A through FIG. 5.

In FIGS. 1A and 1B the effect of pheobarbital of various concentrations on the enzyme activity is graphically shown.

In the assay of serum standard containing 80 mg/L, addition of excess phenobarbital increased the activity at the 100 s point from 55 to 70 U/L. Over the next 4 minutes the activity decreased approximately 6%. By contrast, addition of buffer permitted the usual 25% decrease in activity over the next 4 mins. (FIG. 1, both charts, upper curves.)

When the 10 mg/L standard was assayed, the effect of phenobarbital addition was intermediate. Compared to the buffer injection, phenobarbital increased the initial activity and stabilized it. (FIGS. 1, both A and B, middle curves.) The effect of additional phenobarbital was to move the activity of this assay of an intermediate concentration further away from the zero concentration activity and closer to the higher concentration. The "standard curve" was thus changed to one yielding higher sensitivity.

Addition of excess phenobarbital to an EMIT assay for serum phenobarbital already in progress produced effects that depended somewhat on the serum phenobarbital concentration, i.e., the concentration originally mixed with antibody. When no phenobarbital was present, addition of excess produced a significant increase in activity for the first minute. The activity then stabilized at the higher level. Addition of an equal volume of buffer under the same conditions did not change the activity which had stabilized (FIGS. 1, both A and B, lowest curves). It should be noted that the activity of the first 100 s after reagents were mixed were not recorded in this experiment.

FIGS. 2A–2D demonstrates the effect of adding phenobarbital as a function of the quantity of the phenobarbital added for a specific time of addition.

FIGS. 3A–3C demonstrates the effect of the time of addition of excess phenobarbital.

As the time was increased from 15 to 30 to 60 s, the activity at each level of serum standard concentration decreased. The activity vs. time curve for the intermediate concentration became closer to the zero control, thus indicating decreased sensitivity. The activity increased during the first two mins., particularly at the assays of lower concentrations. This effect was more pronounced as the time of addition of excess phenobarbital was increased.

FIGS. 4A–4D demononstrates activity as a function of excess theophylline in an Emit theophylline assay as compared to phenobarbital in its assay system and produced similar results. Excess theophylline was added to the reaction mixture 30 s after the addition of the theophyllinecoupled G6PDH, instead of the 15 s used in the phenobarbital assay. The theophylline concentration (mol/L) needed to saturate antibody sites was equal to that of phenobarbital used in the phenobarbital assay.

FIG. 5 demonstrates an end-point procedure determination. The reagents and sample were diluted to 1/7 of that which was recommended by the manufacturer, excess phenobarbital was added 15 s after the start of the reaction, and the absorbance was measured after 25 mins. The absorbance at 25 mins. reproduced the characteristic activity vs. concentration curve. This end-point determination permits conservation of expensive reagents.

As demonstrated in the foregoing examples, the rate of the enzyme catalyzed reaction was effectively stabilized by introducing a large quantity of free antigen and thus saturating the antibody. After the rate was stabilized, it could be measured over a longer period with the consequent predictable increase in precision and reliability of result. Smaller concentrations of enzyme could be measured allowing conservation of reagent (and sample) for performing the same assay. Smaller differences in enzyme activity could be distinguished, permitting higher precision of estimation of antigen.

End-point enzyme assays, requiring, as usual, greater quantities of product formed for equivalent precision, could now be used. Automating the assay using equipment customarily used for end-point assays is thus more feasible. Without wishing to be bound by any theory or mechanism, stopping the reaction of enzyme-coupled antigen with antibody in mid-course by adding excess free antigen was possible because the rate of association of free antigen with antibody is faster than that of enzyme-coupled antigen, and dissociation of enzyme-coupled antigen from the antibody proceded to only a small extent in the time periods used.

In the prior art EMIT assay there is sufficient antibody present to bind all the enzyme-labeled drug and many times the quantity of free antigen usually present. The marked effect of a small amount of free antigen on the rate of association of enzymecoupled drug strongly suggests that the affinities of different antibody sites are very different and that the first sites to react with antigen are few in number and react rapidly. If the reaction is stopped early in its course, small changes in unlabeled antigen present on the antibody produce larger changes in enzyme activity. Use of only these rapidly-reacting sites thus gives rise to increased sensitivity, here defined as the ability to distinguish smaller changes in concentration at low concentrations.

The time courses of the reactions after addition of saturating antigen when different quantities of antigen were originally present were different. All showed an increase in activity, consistent with the idea that some of the enzyme-labeled antigen bound to antibody was released. More seemed to be released when there was little unlabeled antigen originally present. When concentrations of unlabeled antigen were high, the activity increased slightly then decreased slowly with time. All of these changes appear to be consistent with many different reactions occuring simultaneously at antibody sites with different affinities for labeled and unlabled antigen. All the changes in activity were, however, small compared to those in the usual EMIT procedure. The approach of the present invention may be applied to other forms of sequential addition immunoassay where increase sensitivity would be desirable. Further, in the homogeneous enzyme immunoassay, by stabilizing the enzyme activity, it permits the enzyme activity to be measured for a longer period, thus permitting greater advantageous use of the enzyme as a label.

As examples, this present invention will also provide a means for improving competitive binding assays in which the ligand is chemically reacted with a reagent that renders it radioactive, fluorescent, phosphorescent, or chemiluminescent, or capable of being converted to a fluorescent, phosphorescent, or chemiluminescent compound by further reaction. In these assays, the reaction between binding reagent or antibody, unlabeled analyte (material to be analyzed), and labeled analyte proceed as in the examples cited for enzyme-multiplied immunoassay, i.e. labeled analyte binds to binding reagent at a slower, measurable rate so that the quantity bound increases with time of reaction. Excess analyte is then added to saturate or flood unreacted binding sites and thus to modify or terminate the reaction of labeled analyte with binding reagent. Comparable benefits in terms of speed of assay, increased precision and accuracy result.

The subject invention provides an extraordinarily sensitive probe for the assaying of extremely minute amounts of specific materials with a high degree of specificity and accuracy. Alternatively, the method can be used qualitatively to determine the presence or absence of particular materials with a high degree of specificity.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method for performing an immunoassay to determine the presence and quantity of a compound in a solution, comprising the steps of:
   (a) adding to the solution a binding reagent capable of binding to the compound being assayed, the binding reagent to be added in a quantity greater than that necessary to react with all of the compound, and adding to the solution a known quantity of a labeled ligand, the labeled ligand being composed of the same compound as that being assayed covalently bound to a label, said labeled ligand binding to the binding reagent more slowly than the compound binds to the binding reagent, the known quantity of labeled ligand being less than that necessary to saturate the binding capacity of the binding reagent, and the labeled ligand having a distinctive property which can be detected;
   (b) adding to the solution after a predetermined time period following the addition of the labeled ligand to the solution, a quantity of the same compound as that being assayed, the quantity being greater than that necessary to saturate the binding capacity of the binding reagent so as to stop effectively further reaction of the binding reagent with the labeled ligand, thereby permitting an assay of the proportion of the labeled ligand which is bound to the binding reagent, the predetermined time period being such that a reaction between the labeled ligand and the binding reagent is not completed or the reaction does not reach equilibrium;
   (c) determining the proportion of the labeled ligand which is free in the solution or the proportion of the labeled ligand which is bound to the binding reagent by assaying for the presence of the distinctive property on the binding reagent or the absence of the distinctive property from the solution;
   (d) identifying the quantity of the compound being assayed originally in the solution by comparing the proportion of bound or free labeled ligand, which is directly related to the quantity of the compound originally present in the solution, with a standard curve prepared by assaying, in accordance with steps (a) through (c), samples containing known quantities of the compound dissolved in a substrate similar to the solution.

2. A method as in claim 1 in which the labeled ligand includes a covalently bound enzyme, the activity of the enzyme being effected by its binding to the binding reagent, whereby the enzyme activity is the distinctive property which is assayed.

3. A method as in claim 1 in which the labeled ligand includes a covalently bound, radioactively labeled, polymer or protein, whereby the radioactivity of the bound or free labeled ligand is the distinctive property which is assayed.

4. A method as in claim 1 in which the labeled ligand includes a covalently bound polymer or protein labeled by a fluorescent compound whereby the fluorescence is the distinctive property which is assayed.

5. A method as in claim 1 in which the labeled ligand includes a covalently bound polymer or protein labeled by a component of a chemiluminescence reaction, whereby the chemiluminescence is the distinctive property which is assayed.

* * * * *